Feb. 6, 1945.    D. McL. FROTHINGHAM    2,368,980
APPARATUS FOR EXTRUDING HOLLOW ARTICLES
Filed Dec. 31, 1940    4 Sheets-Sheet 1

INVENTOR.
DONALD McL. FROTHINGHAM
BY
Fay, Macklin, Golrick and Williams.
ATTORNEYS.

Feb. 6, 1945.  D. McL. FROTHINGHAM  2,368,980
APPARATUS FOR EXTRUDING HOLLOW ARTICLES
Filed Dec. 31, 1940  4 Sheets—Sheet 4

INVENTOR.
DONALD McL. FROTHINGHAM
BY
ATTORNEYS.

Patented Feb. 6, 1945

2,368,980

UNITED STATES PATENT OFFICE 2,368,980

APPARATUS FOR EXTRUDING HOLLOW ARTICLES

Donald McL. Frothingham, Noroton, Conn., assignor to Ferrex Corporation, New York, N. Y., a corporation of Delaware Application December 31, 1940, Serial No. 372,598

3 Claims. (Cl. 207—3)

The present invention is directed to the forming by extrusion of articles with a hollow interior of predetermined contour.

It is known that articles may be extruded with a hollow interior by the use of a piercing mandrel to form a hole in the hollow slug which in turn is reproduced in the article after it has been extruded. Insofar as I am aware there has been no method of extrusion by which the configuration of the interior of the article could be accurately controlled and reproduced in an indefinite number of articles.

It is desirable to form many varieties of extruded articles which are open at one end and which are closed at the other end. Such articles may assume various shapes and the internal opening or bore may vary in contour in accordance with the uses to which the finished product is to be put.

Currently the extrusion of blanks for shells in military ordnance work presents a large field for the use of the apparatus of my invention.

The general object of the invention has been to provide an apparatus by which a new article of manufacture can be made which is characterized by an extruded shape with a hollow interior of varying and controlled diameter. A further object of the invention has been to provide for the making of such an article by the use of a piercing mandrel and an orifice and the maintenance of a predetermined distance between the end of the mandrel and the orifice. Still another object of the invention has been to permit variation in the distance between the mandrel end and the orifice to thereby vary the size of the opening formed in the article. Still another object of the invention has been to provide an automatic operation of apparatus embodying the invention.

In general, it is contemplated to employ a pair of opposed extrusion members which are adapted to cooperate to force a slug of material through an orifice to thereby impart to the material a predetermined exterior contour. A piercing mandrel is provided which pierces the slug and cooperates with the orifice to impart to the finished article a hollow interior of the finished contour.

In order to prevent premature extrusion through the orifice during the piercing operation a plug member is provided which seals the orifice until the piercing has been effected.

It has been found that the end face of the extruded article may be controlled in shape by controlling the contour of that part of the plug which contacts the slug, and this constitutes a part of my invention.

The contour of the end of the bore in the article may likewise be controlled by providing the mandrel end with a predetermined contour and this likewise constitutes a part of the present invention.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

In said annexed drawings—

Figure 1:
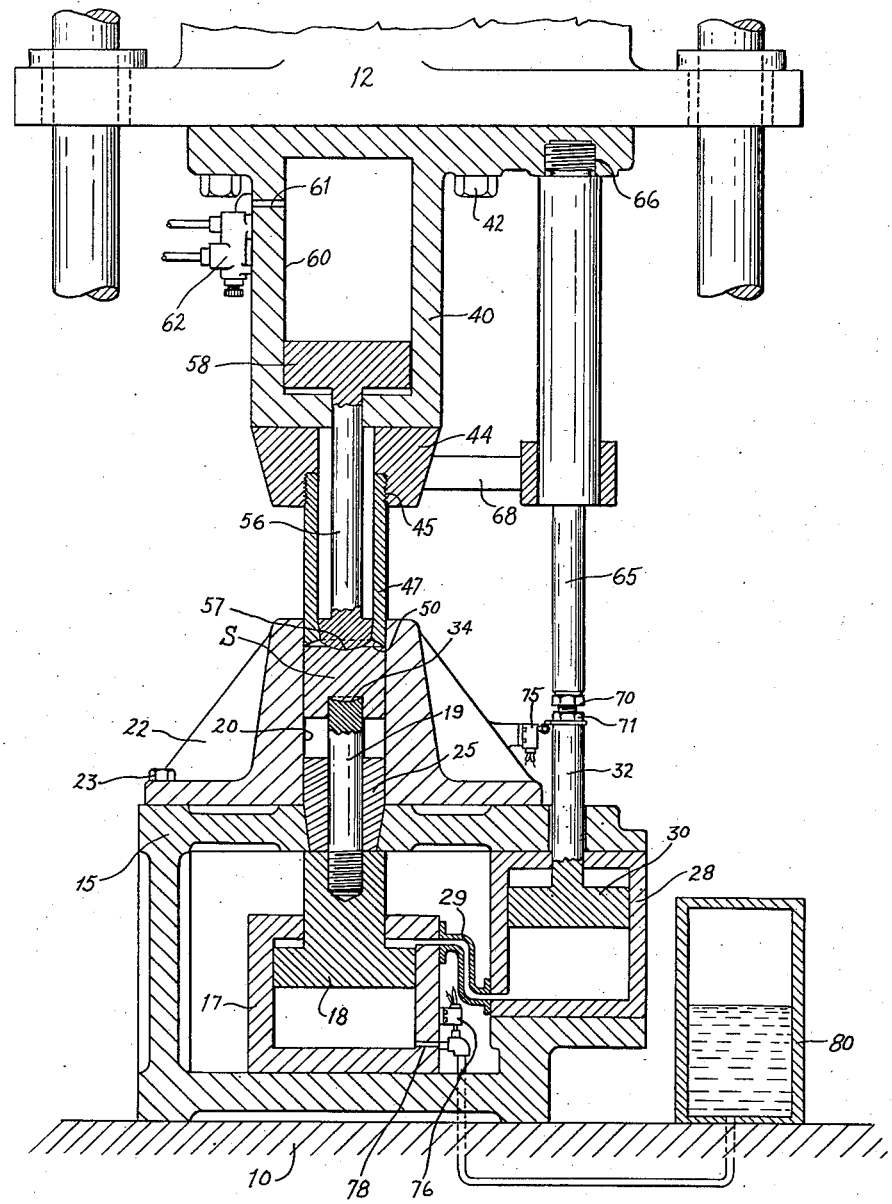
Fig. 1 is a vertical section through an extrusion mechanism embodying the present invention showing the parts near the beginning of the extrusion stroke.

Referring now to Fig. 1, there is provided an extrusion press embodying a bed 10 and a ram 12 movable toward and from the bed to perform the extrusion operation. The extrusion die mechanism is made in two parts which are adapted to nest together and include a ram carried portion and a portion supported on the bed.

In the preferred practice of my invention the extrusion is accomplished by the so-called indirect method, in which the die side walls and the end of the die carrying the mandrel are fixed with respect to each other. The portion of the mechanism in which the orifice is formed is slidingly received within the die to the end that the orifice and the die side walls move relative to each other. The orifice mechanism is supported by the ram and the die mechanism by the base, although it will be understood that this is the preferred showing only and is not intended to limit the invention.

The die mechanism comprises a bed casting 15 which is hollow to receive a cylinder 17 bolted to the bed. A piston 18 for purposes hereafter described is slidingly received in the cylinder and supports a piercing mandrel 19 threadingly received therein for easy replacement.

The die in which the mandrel functions is formed, as indicated at 20, in a casting 22 which is bolted as at 23 to the casting 15. A tapered plug 25 is received in the lower end of the die opening 20 and is provided with a central bore in which slides the mandrel 19.

To control the operation of the mandrel a second cylinder 28 is mounted within the casting 15 and communicates, as indicated by the piping 29, with the upper side of the cylinder 17 to connect the same with the lower side of the cylinder 28. A control piston 30, including a piston rod 32, is slidingly received in the cylinder 28, the rod projecting above the level of the cylinder for a substantial distance to be engaged by an element of the ram mechanism hereafter described.

Figure 5:
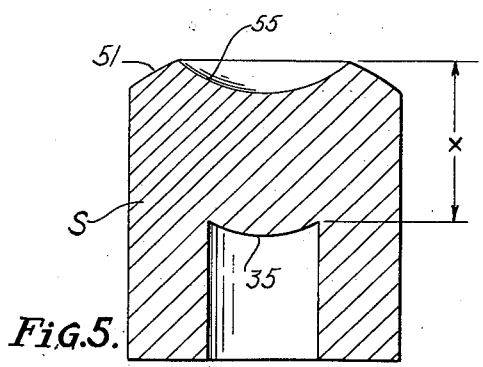
Fig. 5 is a section through the preformed slug prior to actual extrusion through the orifice.
Figure 3:
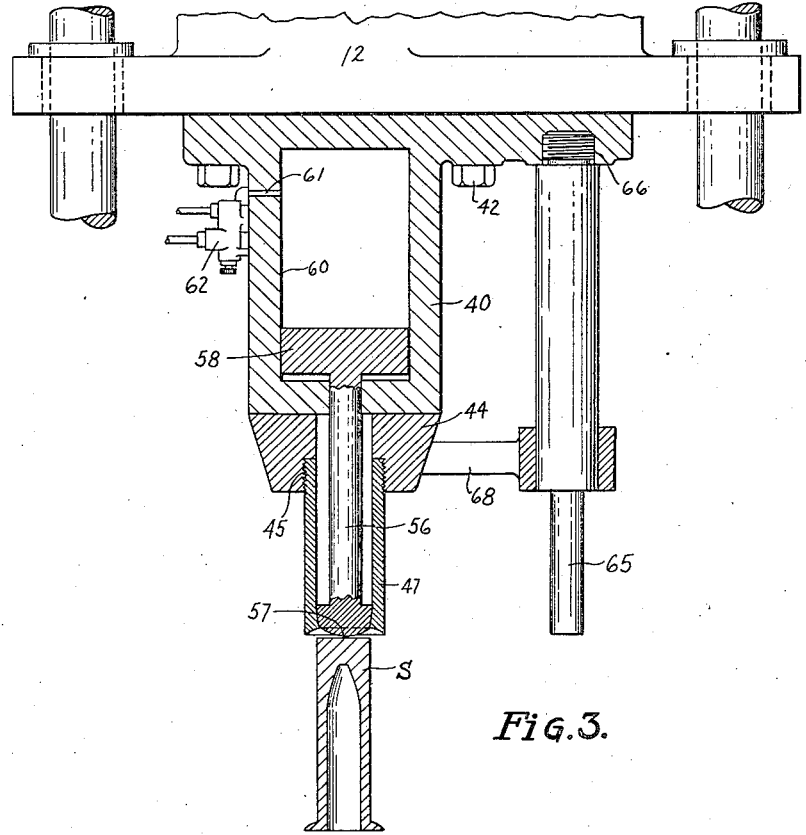
Figure 3:
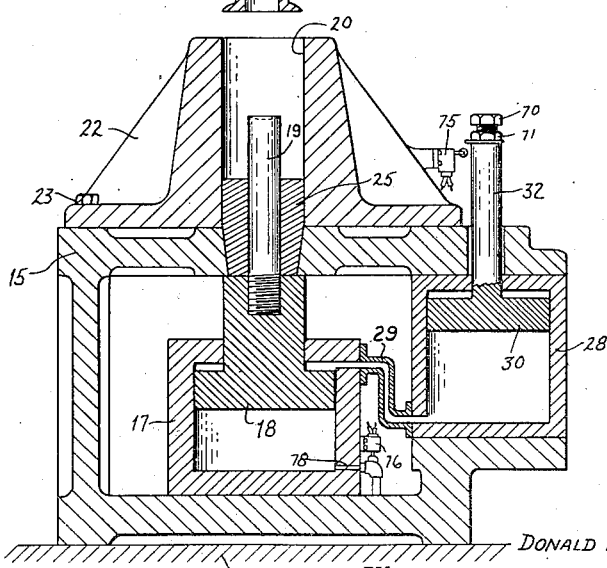

It will be noted that the piercing face of the mandrel is formed with a concave surface, as indicated at 34, to the end that the preformed slug will comprise a bore with a convex bottom as shown at 35 in Fig. 5, the function of which will hereafter be described.

The orifice mechanism which is supported by the ram is carried by a casting 40 which is bolted at 42 to the ram 12. This casting is provided with a cap 44 suitably secured thereto and is bored and tapped as at 45.

Figure 2:
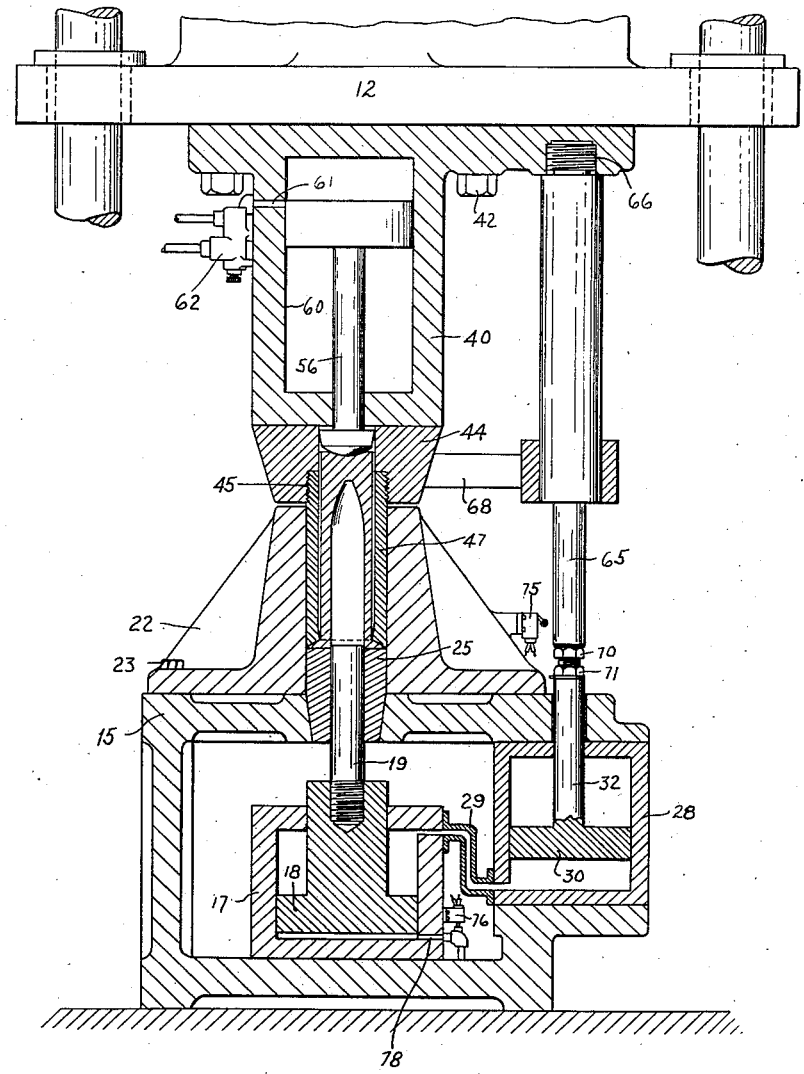
Figs. 2 and 3 are sections similar to Fig. 1 showing advanced portions of the extrusion cycle.

An orifice die member 47 is employed, the external diameter of which is such that it closely fits within the bore 20 of the extrusion die. It is provided with a preformed end face 50 which engages the slug and defines an orifice through which the extruded slug is pushed, as shown in Fig. 2, to form a finished article similar to those shown in Figs. 6 and 7.

The preformed surface adjacent the die orifice is best indicated by the complementary surface 51 shown in Fig. 5 which represents that face of the slug initially formed by the die orifice side wall prior to extrusion.

With the mechanism so far described a slug S, which will generally consist of a cut-off section of a billet in the form of a short cylinder is placed within the die and bounded by the side wall 20. The orifice member 47 and the mandrel 19 exert a squeezing action on the slug, the effect of which is to cause it to completely fill the space between the two and is bounded by the wall 20, to result in a preformed slug of the shape shown in Fig. 5. It is after the formation of this shape that the actual extrusion is effected.

The preformed slug of Fig. 5 will be seen to have a concave upper portion 55, which extends across the entire distance from one edge of the orifice lip to the other. This shape, provided for purposes hereafter stated, is formed by the use of a plug 56, the end of which is formed as at 57 to provide a complementary formed surface which will result in the shape shown at 55.

During the preforming operation the plug is maintained in the position shown in Fig. 1 with respect to the die orifice member 47 to form with it a generally convex end for the slug with a centrally disposed concave portion. To accomplish this purpose the plug is supported by a piston 58, which is received in a hydraulic cylinder 60. Due to the application of fluid pressure within the cylinder 60 the plug is held in the position indicated.

After the preforming operation is finished and it is time to begin the actual extrusion, the fluid pressure just mentioned is released through a port 61 which is controlled by valve mechanism 62 to permit the plug to be pushed upwardly by the forming article, as shown in Fig. 2. It is to be noted in this connection that the internal opening in the orifice member 47 is generally a little larger in diameter than the extrusion orifice, thus preventing friction contact with resulting wear between the article as it is formed and the member 47.

Control of the distance between the mandrel end and the orifice is accomplished through the operation of a bar 65, which is threadingly received at 66 in the casting 40 and is braced with respect thereto by the rib member 68. As the ram descends the bar 65 will come into contact with the piston rod 32 heretofore described to actuate the piston 30 to control the mandrel, the exact point at which the bar and rod will come in contact is adjusted by a bolt 70 and a lock nut 71 carried by a rod 32.

As hereafter described, the present invention is predicated upon maintaining a controlled distance between the end of the mandrel and the edge of the extrusion orifice, a distance which is indicated in Fig. 5 by the letter X and the associated arrow. In order to extrude an article in accordance with the present invention there must be provided some means to ascertain that the distance at the beginning of the extrusion stroke, as well as at all points therein, is accurately known. It is not sufficient to merely move the orifice member 47 and the mandrel 19 toward each other until the slug is pierced to a predetermined point or until a form similar to that of Fig. 5 is obtained, at which time an external pressure will be set up as distinguished from the pressure required to fill up the air spaces within the die unit. If every slug placed within the dies was uniform the controls outlined above would be satisfactory. Since, however, the invention is employed with sawn-off pieces of billets it is obvious that the over-all length cannot be accurately controlled, nor can the cross-sectional dimensions be known unless methods prohibitive in cost are employed to form the slug. Accordingly, in the practice of my invention I pierce with the mandrel until a distance X is obtained between the end of the mandrel and the end of the orifice. I then continue the closing movement of the die members to flow the material throughout all the die spaces and build up the extrusion pressure while maintaining this distance X constant. This is done by retracting the mandrel at a speed exactly equal to the advancing speed of the orifice member 47.

A downward push on the piston 30 transmitted from the punch through the bar 65 is employed to establish a downward pressure on the piston 18 to retract the mandrel. In order to do this at the same speed at which the ram supporting member 47 is moved the under area of the piston 30 and the top area of the piston 18 are equal. This results in displacement of oil from the cylinder 28 to the cylinder 17 through the pipe 30 such that the increase in displacement in the latter cylinder is always equal to the decrease in displacement in the cylinder 28.

It is well to point out here that the mandrel 19 and its related piston 18 are supported during the piercing operation by hydraulic pressure on the under side of the said piston within the cylinder 17 and this pressure must be released when the mandrel is forced downwardly.

To thus control the piston 18 a limit switch 75 is engaged by the rod 32 at the instant it starts its downward movement and operates through a suitable electric circuit to actuate a solenoid valve 76, opening a port 78 in the bottom of the cylinder 17 to permit the exhaust of the same into a tank 80 which is maintained under a head of air at a pressure sufficient to raise the piston 18 and the mandrel 19 against their weight when they are free of load. Thus, as the piston 30 descends it may push the piston 18 downwardly, pushing oil out of the opening 78 back into the tank 80. When the extrusion stroke has ended and the ram begins to rise the downward pressure on the rod 32 will be removed. At this time the air in the tank 80 will force oil back through the opening 78, raising the piston 18 and the mandrel 19 to their initial positions.

As the piston 18 rises oil is forced back beneath the piston 30, raising the rod 32 to its initial position whereupon the limit switch 75 will be again actuated to close the valve 76, retaining the mandrel in an elevated position until the punch again descends to bring the bar 65 and rod 32 in contact.

Figure 4:
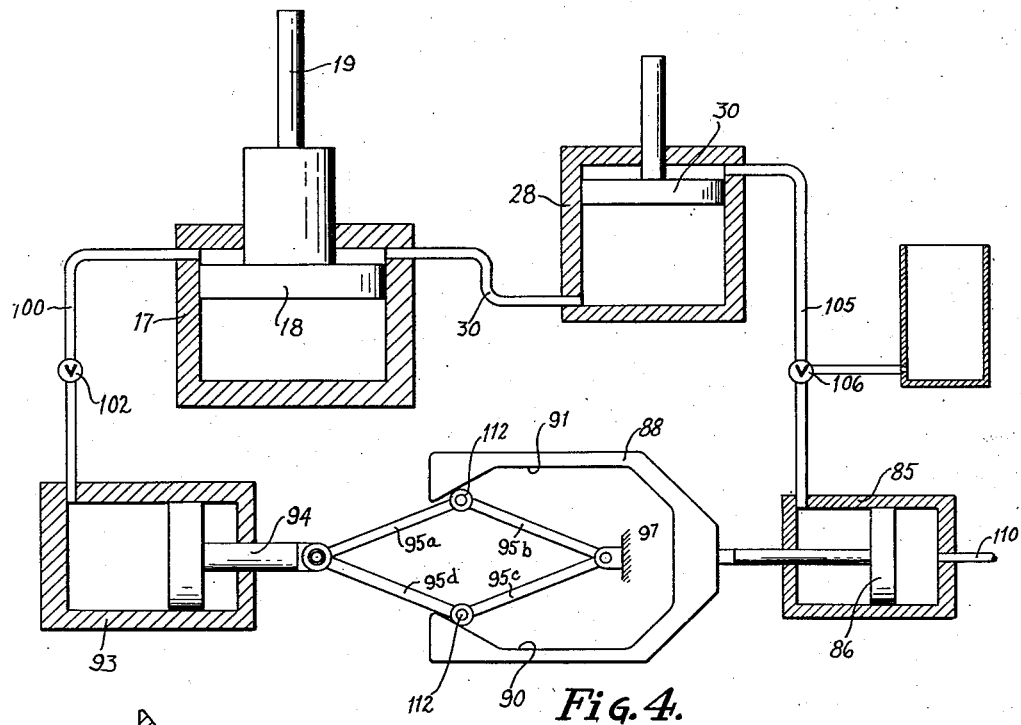
Fig. 4 is a schematic showing of the hydraulic control system employed.

As indicated above, by the use of the equipment thus far described it is possible to move the mandrel downwardly at a constant rate, which, however, is dependent upon the position of the ram. I shall now describe mechanism by which the mandrel may be controlled independently of the position of the ram and its corresponding orifice member 47 to vary the distance X between the orifice and the end of the mandrel. Such mechanism is shown in Fig. 4.

Referring to that figure it will be seen that there is provided a cylinder 85 which carries a piston 86 supporting a cam plate schematically shown at 88. The cam plate is formed with a pair of follower surfaces 90 and 91.

Associated with the aforementioned mechanism is a second cylinder 93 with a piston 94 supported therein. The piston 94 is operatively connected with four links 95A, 95B, 95C and 95D, which are pivotally mounted with respect to each other to form a parallelogram. The link pivot opposite to the piston 94 is fixedly supported at 97 with respect to the foundation.

The hydraulic system by which the lower portion of the cylinder 28 and the upper portion of the cylinder 17 are connected includes a further connection 100 with the cylinder 93. A valve 102 is interposed in this line. It will be apparent, however, that if the piston 94 is displaced during the downward travel of the piston 30 a greater or less amount of oil will be placed within the cylinder 17 than is removed from the cylinder 28. Thus if the piston 94 reduces the volumetric capacity of the cylinder 93 during this interval the piston 18 will drop further than will the piston 30. On the other hand, if the piston 94 increases the volumetric capacity during this interval the piston 18 will not drop as far as will the piston 30.

To control the relative position of the piston 94 an oil line 105 is provided which connects through a three-way valve 106 from the cylinder 85 to the cylinder 28 on top of the piston 30. This valve is normally connected to an oil reservoir and during the mandrel travel prior to extrusion the upper part of the cylinder 28 is receiving oil from this reservoir. When actual extrusion starts the three-way valve disconnects the oil reservoir and allows oil from cylinder 85 to pass to cylinder 28. The two valves 102 and 106 are solenoid controlled to be opened at the instant the extrusion pressure is built up and the actual extrusion begins by the opening of the valve 62 above the plug to release the same and permit the passage of the plastic material through the orifice. As the piston 30 continues its further descent a vacuum will be created above the piston, allowing oil to flow thereto out of the cylinder 85. A constant fluid pressure applied to the piston 86 through the passage 110 from any suitable source will then move the piston and its associated cam plate toward the left, Fig. 4. This will cause a pair of rollers 112 and 113 of the link mechanism to travel toward or away from each other, depending on the contour of the cam follower surfaces. This in turn will actuate the piston 94 to either increase or decrease, or hold constant, the volumetric capacity between the piston and the cylinder 93. As above indicated, this acts to control the rate of movement of the mandrel 19 with respect to the orifice member 47.

Figure 6:
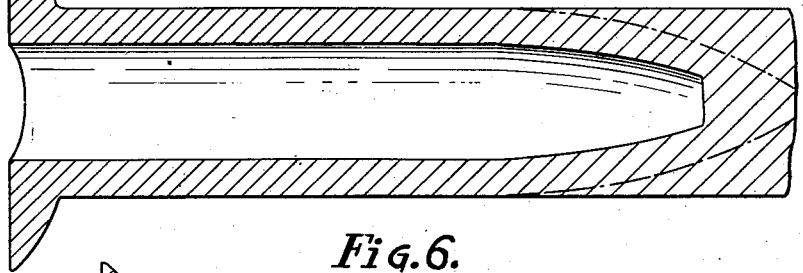
Fig. 6 is a transverse section through an extruded article showing one end of the bore tapered.
Figure 7:
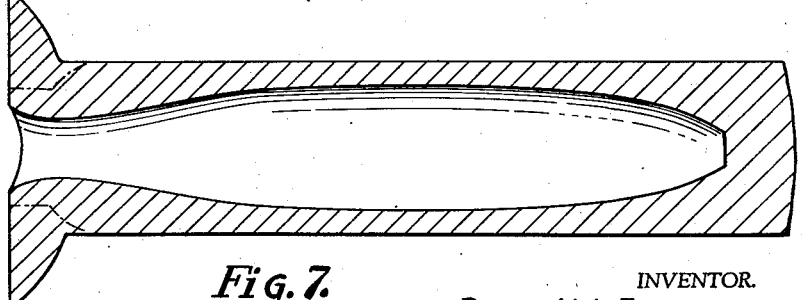
Fig. 7 is a similar section showing a tapered bore at each end of the slug.

It will be understood that the die contour shown in Fig. 4 is in no sense limiting, but that it merely shows one type of cam plate in which the piston is first retracted where the follower surfaces are separating and is then held in fixed position where the follower surfaces are parallel and later is pushed forwardly into the cylinder where the follower surfaces again converge. In general, this type of cam plate will result in the shape shown in Fig. 7 where the central portion of the bore is uniform in diameter and each end is tapered. Fig. 6 shows an extruded blank adapted for use in shell making where the bore is of constant diameter except at the inner end where it is tapered. Such a shape would require a cam plate with a pair of diverging side walls followed by a section with side walls which are parallel with each other. Many other shapes may be made under the present invention and these shapes may each be controlled by providing a predetermined contour for the cam plate 88.

As heretofore stated, it is desirable to finish the blanks as shown in Fig. 6, with a generally square end at the right and to provide the bore with a generally flat bottom. It has been found that by shaping the preformed blank of Fig. 5 with a convex surface 35 and the concave surface 55 this result will follow. As the central body of material between the two surfaces tends to fold out during extrusion, the degree of squareness in the blank end is controlled by the depth of the concavity 55, and likewise the degree of convexity in the surface 35 controls the shape of the end of the bore.

In making projectiles and similar articles to be loaded with high explosive an ultimate object is to provide an outer casing which will break up into small pieces when the charge is exploded. This fragmentation may be accurately controlled with my invention by forming intersecting lines of weakness throughout the extruded article. Then when the shell explodes it will break up along these lines of weakness much in the manner a hand grenade bursts due to its checkerboard exterior.

This result is obtained by employing a fluted mandrel which will form the interior bore of the article with a series of longitudinally extending ridges and valleys to produce an effect analogous to corrugation.

A series of axially extending annular corrugations is provided by alternately sharply increasing and decreasing the internal diameter of the bore. This may be accomplished by oscillating the mandrel 19 during the extrusion operation to alternately increase and decrease the value of the distance X. Such oscillation may be secured by incorporating within the mandrel construction an additional hydraulic piston and cylinder, the piston supporting the mandrel and the cylinder supporting the piston with respect to the orifice member 47. Oil or similar medium is used to alternately apply a pressure on opposite sides of the mandrel supporting piston to shift the same back and forth, which will result in the desired internal shape being given to the finished extruded article.

From the foregoing description it will be seen that I have provided an apparatus for extruding hollow shapes, together with an improved shape which results in a product capable of wide usage.

Other forms may be employed embodying the features of my invention instead of the one herein explained, change being made as regards the means and the steps herein disclosed provided the elements stated by any of the following claims or the equivalent of such stated elements be employed.

I therefore particularly point out and distinctly claim as my invention:

1. In apparatus for extruding hollow articles, a pair of die members mounted for movement relative to each other to effect an extruding operation, an extrusion orifice formed in one of said members, a piercing mandrel mounted in the other of said die members and mounted for axial movement in alignment with the orifice of said first die member, an hydraulic cylinder in alignment with said mandrel, an extension on said mandrel forming a piston in said cylinder, a second hydraulic cylinder interconnected with said cylinder, a piston in said second cylinder mounted to be actuated upon relative movement between said two die members to force liquid from said second cylinder into said first cylinder to thereby control the relative position of said mandrel with respect to its supporting die member.

2. In apparatus for extruding hollow articles, a pair of die members mounted for movement relative to each other to effect an extruding operation, an extrusion orifice formed in one of said members, a plug member adapted to temporarily seal said orifice, an hydraulic cylinder and piston in alignment with said plug with said plug and said piston acting to move as a unit, a piercing mandrel mounted in the other of said die members and mounted for axial movement in alignment with the orifice of said first die member, an hydraulic cylinder in alignment with said mandrel, an extension on said mandrel forming a piston in said last-named cylinder, a third hydraulic cylinder interconnected with said last-named cylinder, a piston in said third cylinder mounted to be actuated upon relative movement between said two die members to force liquid from said third cylinder into said last-named cylinder to thereby control the relative position of said mandrel with respect to its supporting die member.

3. In apparatus for extruding hollow articles, a pair of hollow die members mounted for movement relative to each other to effect an extruding operation, an extrusion orifice formed in one of said members, a piercing mandrel mounted in the other of said die members, ram means to effect relative movement between said die members, means responsive to said relative movement to move said mandrel and the die member having said extrusion orifice with respect to said other die member at the same rate of speed and means capable of varying the distance between said orifice and said mandrel independently of the position of said ram.

DONALD McL. FROTHINGHAM.